United States Patent
Brambilla

(10) Patent No.: US 9,863,750 B2
(45) Date of Patent: Jan. 9, 2018

(54) MODULAR SYSTEM FOR CHECKING A VALVE SEAT AND A VALVE GUIDE IN CYLINDER HEADS OF INTERNAL COMBUSTION ENGINES

(71) Applicant: Marposs Societa' Per Azioni, Bentivoglio (IT)

(72) Inventor: Daniele Pasqualino Brambilla, Bernareggio (IT)

(73) Assignee: Marposs Societa' Per Azioni, Bentivoglio (bo) (IT)

( * ) Notice: Subject to any disclaimer, the term of this patent is extended or adjusted under 35 U.S.C. 154(b) by 236 days.

(21) Appl. No.: 14/892,938

(22) PCT Filed: May 5, 2014

(86) PCT No.: PCT/EP2014/001186
  § 371 (c)(1),
  (2) Date: Nov. 20, 2015

(87) PCT Pub. No.: WO2014/187532
  PCT Pub. Date: Nov. 27, 2014

(65) Prior Publication Data
  US 2016/0091293 A1   Mar. 31, 2016

(30) Foreign Application Priority Data
  May 22, 2013  (IT) .............................. MI2013A0835

(51) Int. Cl.
  *G01M 15/02*   (2006.01)
  *G01B 5/00*    (2006.01)
  (Continued)

(52) U.S. Cl.
  CPC .............. *G01B 5/0032* (2013.01); *F01L 1/46* (2013.01); *F01L 3/20* (2013.01); *G01M 15/042* (2013.01)

(58) Field of Classification Search
  USPC .......................................... 73/114.77, 114.79
  See application file for complete search history.

(56) References Cited

U.S. PATENT DOCUMENTS 3,988,925 A * 11/1976 Seccombe ................. F01L 1/20
                                                    33/611
4,545,706 A * 10/1985 Hiroyasu ................ B23C 3/055
                                                    408/1 BD (Continued)

FOREIGN PATENT DOCUMENTS

DE  20 2009 015 796 U1  3/2010
JP       2000-126943 A   5/2000

OTHER PUBLICATIONS

International Preliminary Report and Written Opinion dated Nov. 24, 2015 for International Application No. PCT/EP2014/0001186.

*Primary Examiner* — Eric S McCall
(74) *Attorney, Agent, or Firm* — Blank Rome LLP; Mark J. Thronson; Tara L. Marcus

(57) ABSTRACT

A modular system (1) for checking a valve seat and its associated valve guide in cylinder heads of internal combustion engines comprises a guide and support assembly (10), movable in three directions, which carries one or more electronic gauges (11) and a precentering pin (14) to guide the insertion of the gauge in the valve seat and its associated valve guide, and a tilting table (3) for loading and locating a cylinder head (4). Thanks to the particular structure of a support mechanism (12) connected to the guide and support assembly, the gauge is able to self-position on the valve seat to be checked and to disengage in a checking condition from the guide and support assembly at least in one of the three directions. The tilting table can be adjusted depending on the dimensions and layout of the cylinder head to be checked and includes a swing system (6) to set the tilt of the table as (Continued)

a function of the inclination of the valve seat and its associated valve guide to be checked.

18 Claims, 6 Drawing Sheets

(51) Int. Cl.
*F01L 1/46* (2006.01)
*F01L 3/20* (2006.01)
*G01M 15/04* (2006.01)

(56) References Cited

U.S. PATENT DOCUMENTS

| | | | | |
|---|---|---|---|---|
| 5,533,384 A * | 7/1996 | Pierce | | G01B 5/0032 73/47 |
| 5,613,809 A * | 3/1997 | Harmand | | B23C 3/055 408/1 R |
| 6,006,437 A * | 12/1999 | Cipriani | | G01B 13/16 33/543.1 |
| 6,205,850 B1 * | 3/2001 | Wehrman | | F01L 1/20 123/90.45 |
| 6,457,353 B1 * | 10/2002 | Kanke | | F01L 9/04 73/114.42 |
| 7,055,762 B2 * | 6/2006 | Gerber | | F02M 65/005 123/617 |
| 2003/0010103 A1 * | 1/2003 | Satish | | F16K 49/002 73/114.79 |
| 2005/0002746 A1 * | 1/2005 | Kress | | B23C 3/055 409/132 |
| 2005/0224050 A1 * | 10/2005 | Schmitfranz | | F02D 41/2096 123/446 |
| 2005/0279159 A1 * | 12/2005 | Firmin | | G01B 13/16 73/114.79 |
| 2006/0010970 A1 * | 1/2006 | Candeo | | G01M 15/044 73/116.04 |
| 2013/0312506 A1 * | 11/2013 | Nielsen | | F01L 1/185 73/114.79 |
| 2016/0138484 A1 * | 5/2016 | Nielsen | | F01L 3/08 73/114.79 |

* cited by examiner

MODULAR SYSTEM FOR CHECKING A VALVE SEAT AND A VALVE GUIDE IN CYLINDER HEADS OF INTERNAL COMBUSTION ENGINES

TECHNICAL FIELD

The present invention relates to a modular system for checking a valve seat and a valve guide in cylinder heads of internal combustion engines.

In particular the system according to the present invention is configured to support electronic gauges for checking valve seats and valve guides in the cylinder heads of internal combustion engines.

BACKGROUND ART

The technological research for reducing fuel consumption and emission of pollutants of the internal combustion engines has led the manufacturers to optimize the manufacturing process of the engine components in order to achieve ever higher machining accuracy.

The demand for higher standards of quality in the machining of some components, such as the valve seats, has increased significantly over the last few years.

Different types of so-called electronic plug gauges for checking dimensions of a valve seat and its associated valve guide are known on the market. The gauges are usually operated by an operator's hand which manually positions the gauge into the valve seat and valve guide to be checked.

As a consequence, all the measures detected by the gauges are affected by the inevitable interaction between the gauge and the operator.

A solution to this problem is disclosed in the US patent application published under No. 2005/0279159 which describes a valve seat gauging system with a gauge, wherein there is no operator's manual intervention on the gauge during the measurement procedure. The system includes a gauge head movably connected to a gauge support, which in turn is connected to a support frame by means of a system of movable arms enabling the gauge support to move in all three dimensions. An adjustable balancing system (consisting in a balancing arm in the preferred embodiment of FIG. 3 or included in a main body in the alternative embodiment of FIG. 6) exerts a pre-determined load onto the gauge support.

In the embodiment of FIG. 3, thanks to the presence of the system of movable arms, during the measurement cycle (that is after the operator has moved the gauge into position over the valve seat to be checked and release it) the gauge support is decoupled from any forces except for the predetermined load exerted by the balancing system.

According to the alternative embodiment of FIG. 6, the gauging system includes, in addition to the first gauge head, a second gauge head, or a component having the same form as a gauge head, which is inserted in the valve seat adjacent to the valve seat to be checked in order to locate the first gauge head.

Also in this case, the first gauge head is decoupled from any forces except for the predetermined load exerted by the balancing system.

However, in the systems described in the publication No. 2005/0279159 the complex mechanical connection between the gauge head and the support frame can cause, during the measurement cycle, unwanted forces deriving from the interaction of the components of the gauging system. Also the structure of the system of movable arms itself is not simple and can experience frictions or other forces between its different parts.

Moreover the predetermined load exerted by the balancing system needs an accurate regulation, which otherwise inevitably affects the measurement.

DISCLOSURE OF THE INVENTION

Object of the present invention is to provide a modular system for checking a valve seat and a valve guide in cylinder heads of internal combustion engines which is simpler than the known systems and overcomes problems related to the manual handling of the gauge, in particular damages or measuring errors due to the wrong positioning of the gauge with respect to the cylinder head to be checked and/or alterations of the measure due to the influence of the operator's hand, in order to achieve better results in terms of accuracy and reproducibility.

A further object of the invention is to provide a highly flexible system which can be adjusted to the dimensions and layout of most part of the cylinder heads currently produced.

These and other objects are achieved by a system for checking a valve seat and a valve guide in cylinder heads of internal combustion engines as defined in the enclosed claims.

The system according to the invention ensures, thanks to its constructive features, high reliability and safety in use.

BRIEF DESCRIPTION OF THE DRAWINGS

A modular system for checking a valve seat and a valve guide in cylinder heads of internal combustion engines is hereinafter described with reference to the attached sheets of drawings given by way of non-limiting examples, wherein.

BEST MODE FOR CARRYING OUT THE INVENTION

Figure 1:
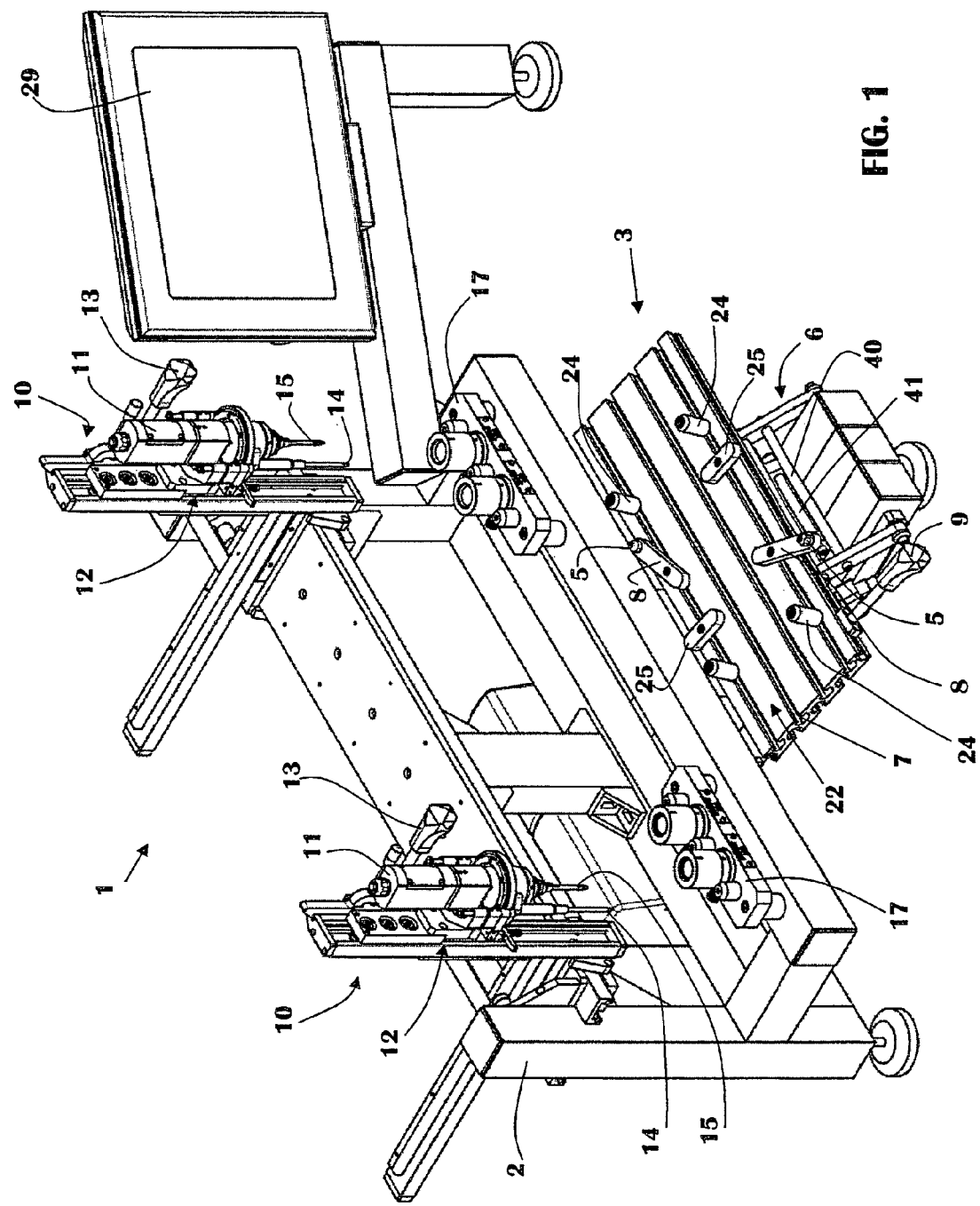
FIG. 1 is a perspective view of the front side of a system according to the present invention.

With reference to the attached sheets of drawings, the modular system according to the invention, which is indicated on the whole with the reference number 1, includes a support frame 2 to which the components of the system are connected, that is a tilting table 3 to load and locate a cylinder head 4, one or more electronic gauges 11, more specifically two so-called plug gauges, for checking dimensional and geometric features of a valve seat and its associated valve guide of a cylinder head, and one or more sample groups 17.

Figure 2:
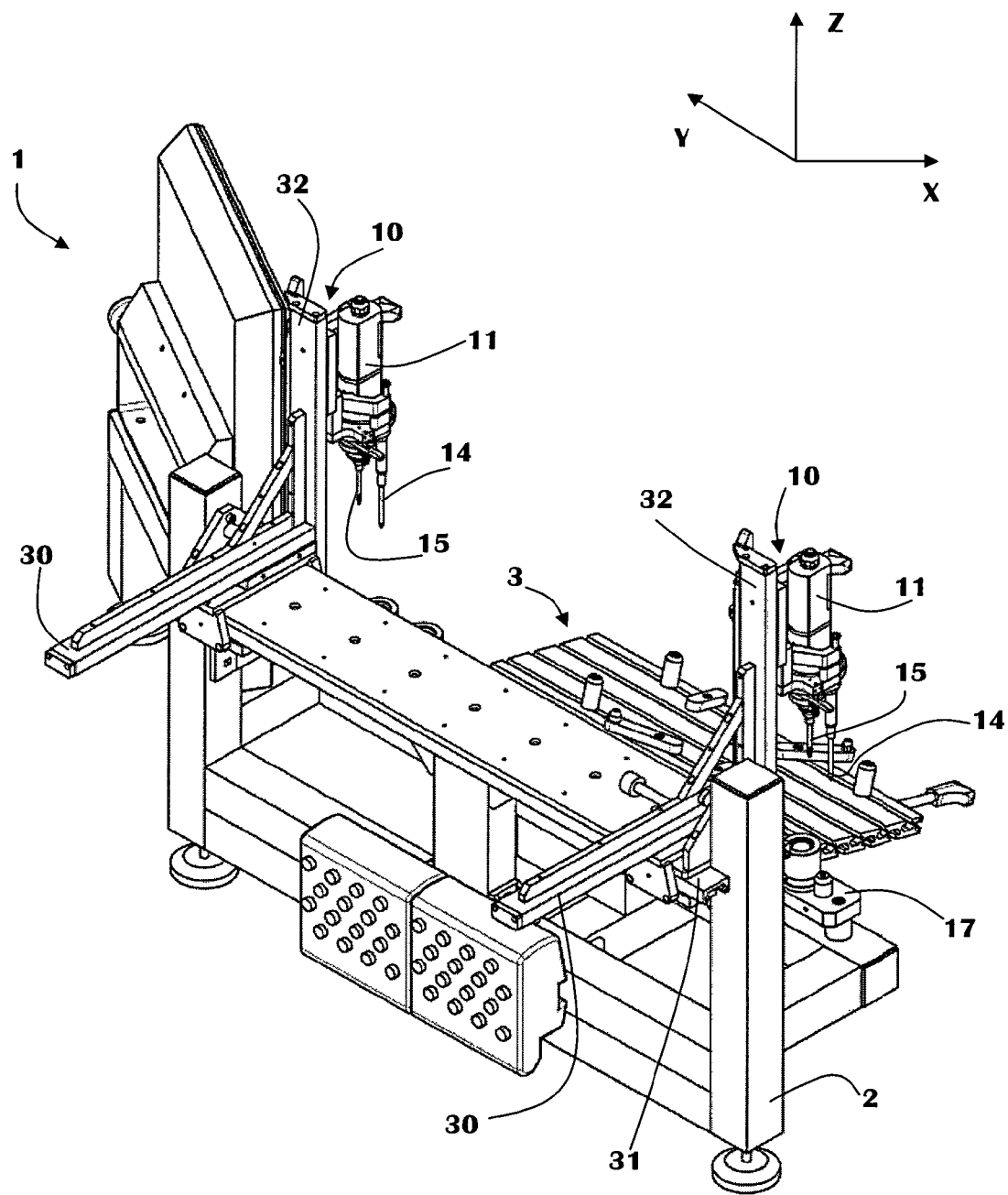
FIG. 2 is a perspective view of the back side of the system of FIG. 1.
Figure 3:
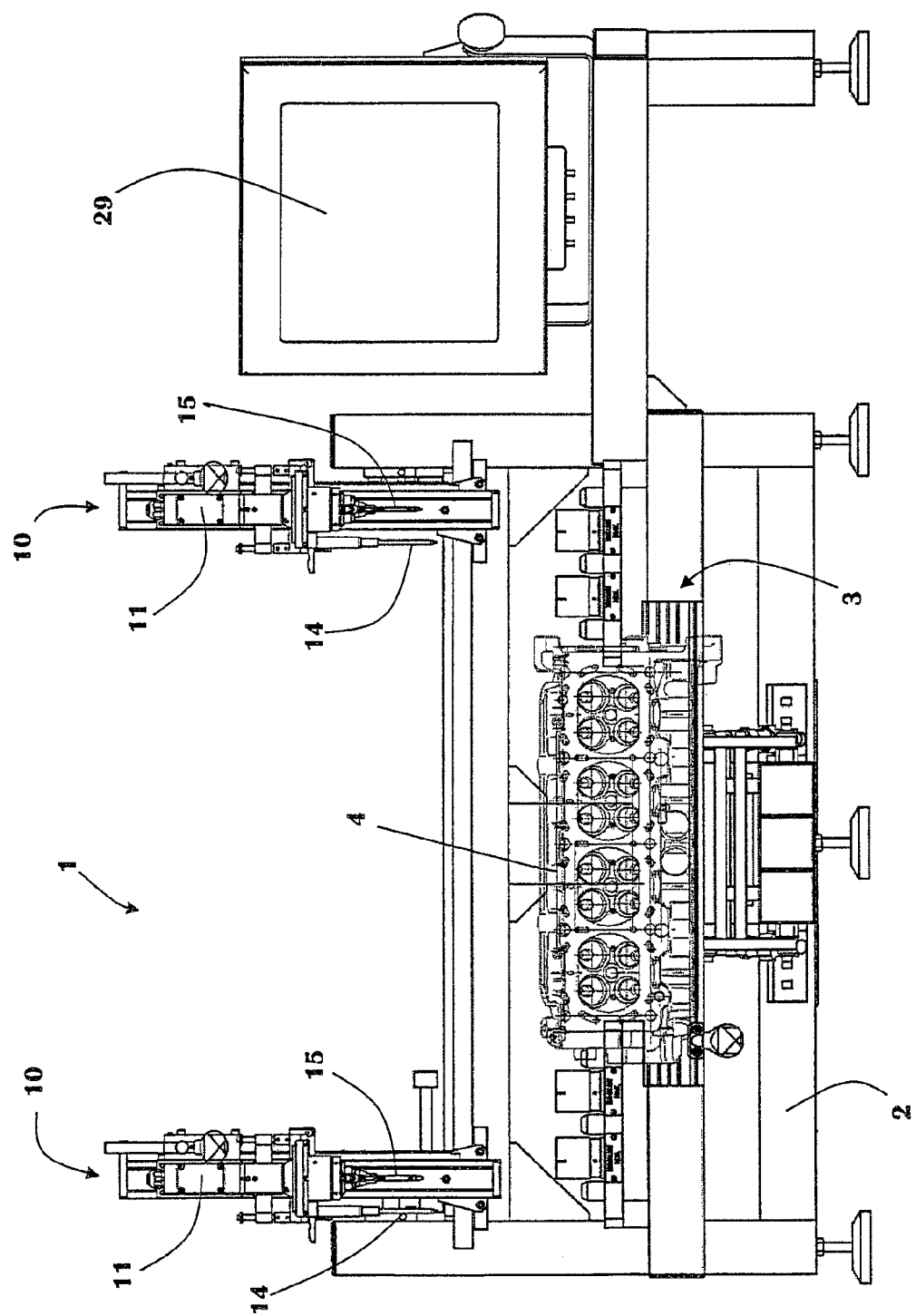
FIG. 3 is a front elevation view of the system according to the invention including also a cylinder head.
Figure 4:
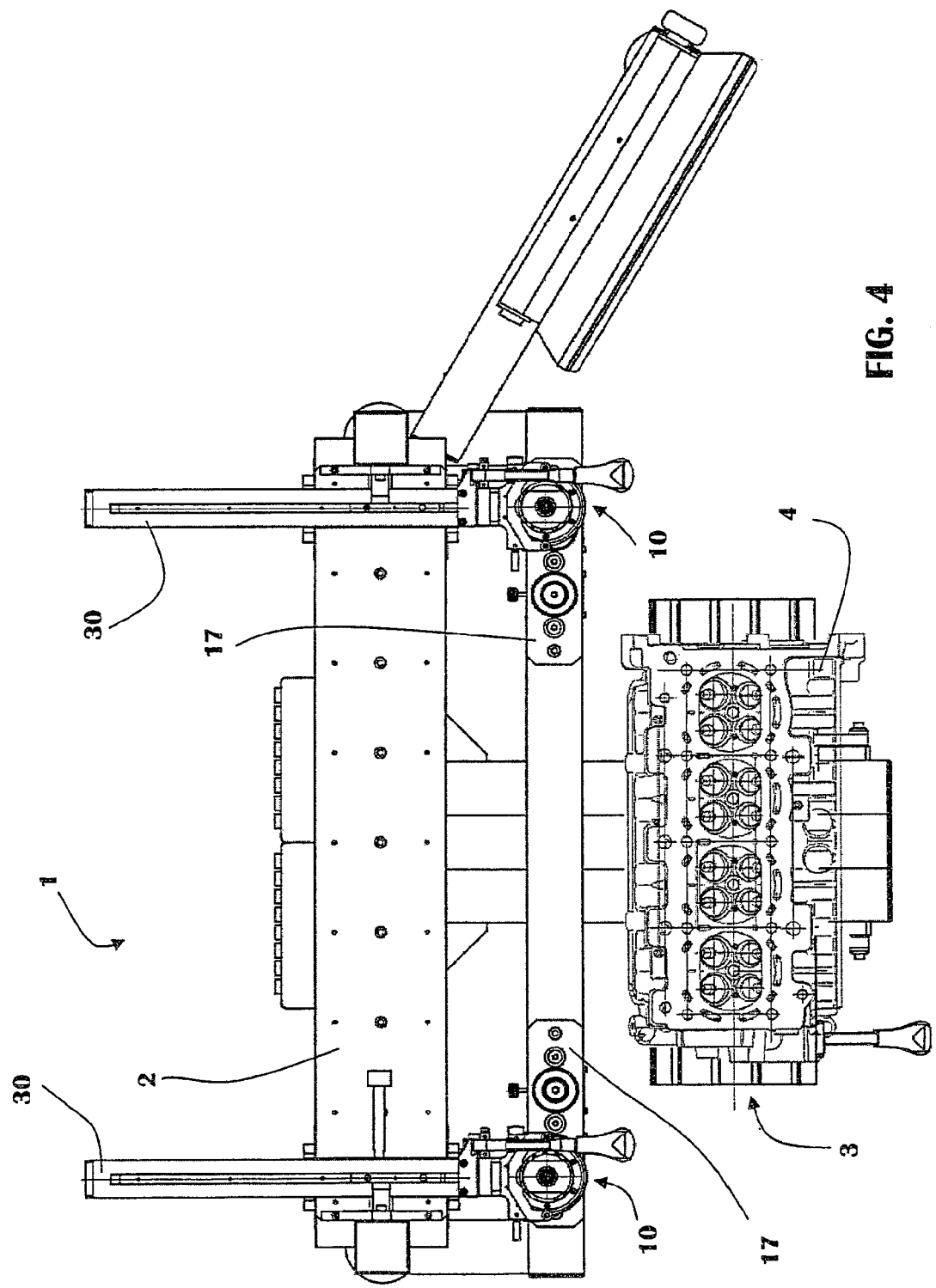
FIG. 4 is a plan view of the system of FIG. 3.
Figure 5:
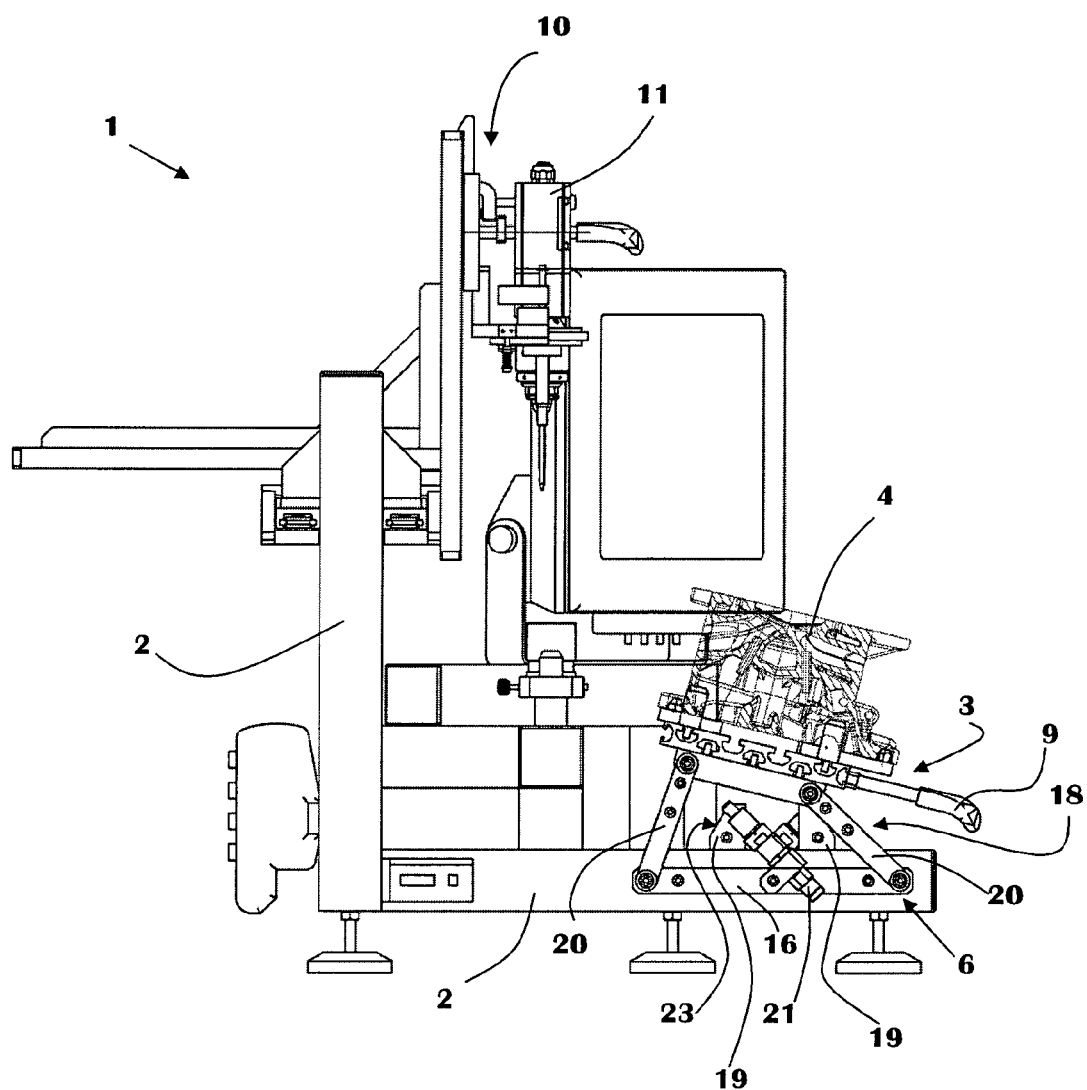
FIG. 5 is a side elevation view of the system of FIG. 3.

The tilting table 3 includes a bearing surface 22 on which the cylinder head 4 to be checked is positioned. As shown in FIGS. 1 and 2, the bearing surface 22 has a longitudinal extension and comprises grooves 7 extending along said longitudinal extension. As it is better visible in FIG. 5, the tilting table 3 is connected to the support frame 2 by means of a swing system 6. The swing system 6 includes two movable bearing groups 18 (just one visible in FIG. 5) which are placed at opposite sides of the swing system, transversally with respect to the longitudinal extension of the bearing surface 22, and comprise each two bars 16, having different lengths, fixed to the tilting table 3 and to a base portion 2' of the support frame 2, and two links 20, having the same length, pivotably coupled to the ends of the bars 16 so as to complete an articulated quadrilateral.

A blocking mechanism 21 for blocking the tilt of the tilting table 3 connects one bearing group 18 to the other. More specifically, the blocking mechanism 21 includes four stop blocks 19 which are connected to the base portion 2' of the support frame 2 in a removable way by means of fastening means. Such fastening means are inserted in grooves in the base portion 2' so that they can slide inside said grooves to change their position. The stop blocks 19 are connected to said fastening means by means of screws which are screwed into said fastening means to fix the position of the latter, and of the stop blocks 19 connected thereto, in the base portion 2'. The grooves in the base portion 2' and the fastening means are not shown in the figures for the sake of simplicity. The stop blocks 19 are linked two by two along the longitudinal extension of the bearing surface by a stem 41 (only two blocks are visible in FIG. 5 and only one stem is visible in FIG. 1). Each block has a sloping, abutment surface 23.

Two rods 40, parallel to the stems 41 connecting the stop blocks 19, connect each one link 20 of one bearing group 18 to a corresponding link 20 of the other bearing group 18 so as to abut against the abutment surfaces 23 of the stop blocks 19 in order to block the tilt of the tilting table 3. One of said rods 40 is visible in FIG. 1.

Thanks to the presence of the blocking mechanism 21, the tilting table 3 can take two stationary positions, one to check intake valve seats and the other to check exhaust valve seats of the cylinder head 4. The tilting table 3 is moved from one position to the other by means of a manually operated lever 9. The two stationary positions are set depending on the dimensions and layout of the cylinder head and in particular the inclination of the valve seat and its associated valve guide.

The tilting table 3, more specifically its bearing surface 22 defines a bearing plane, on which the cylinder head 4 lies, and a perpendicular direction to said bearing plane. The valve seat and its associated valve guide are inclined with respect to the perpendicular direction defined by the tilting table 3.

The possibility of adjusting the tilt of the tilting table 3 serves to align the axis defined by the valve seat and its associated valve guide to be checked with an axis defined by the gauge.

The tilt of the tilting table 3 can be adjusted in a phase of preliminary setting of the system by acting on the stop blocks 19 and setting them according to the inclination of the guide valve seat and its associated guide valve.

In particular, the tilt of the tilting table 3 is set by changing the position of the stop blocks 19 with respect to the base portion 2' so that the abutment surfaces 23 abut against the rods 40 at different points of the their surface with respect to the previous position. The position of the stop blocks 19 is changed by removing the screws and sliding the fastening means in the grooves to place them in a different position with respect to the base portion 2'. After the proper position has been set, the stop blocks 19 are fastened to the fastening means and thus to the base portion 2' again.

As stated above the tilting table 3 includes grooves 7. As shown in FIG. 1, the grooves 7 house locating means 5, 24, 25 for locating the cylinder head 4 to be checked with respect to the tilting table 3.

More specifically, the tilting table 3 includes four reference pins 24 serving as lateral references for the cylinder head 4 to roughly position it on the bearing plane of the tilting table 3, and two centering pins 5 which are inserted in and cooperates with surfaces of the cylinder head 4 to center the latter with respect to the table 3 itself. The centering pins 5 are arranged on opposite sides of the tilting table 3 and are mounted on movable bearing elements 8. Each bearing element 8 has one end carrying the centering pin 5 and the other end connected to the tilting table 3. Two additional bearing elements 25 on which the cylinder rests are connected to the tilting table 3.

The locating means, including the four reference pins 24, the two centering pins 5 and their associated bearing elements 8, and the additional bearing elements 25, are connected to the tilting table 3 in an adjustable and removable way.

More specifically they are coupled to the grooves 7 of the tilting table 3 so that they can be removed and positioned at different points of the tilting table 3 depending on the dimensions of the cylinder head to be checked. Thus, the configuration of the tilting table 3 is such that it can be easily retooled with any kind of cylinder heads.

As stated above, the modular system 1 further includes one or more electronic gauges 11 for checking dimensional and geometric features of a valve seat and a valve guide of the cylinder head. The system shown in the drawings includes two plug gauges, each featuring a gauge nosepiece 15, mounted on opposite sides of the support frame 2: one gauge for checking the intake valve seats of the cylinder head and the other gauge for checking the exhaust valve seats.

Each gauge is connected to the support frame 2 by means of a support and guide assembly 10 which has three degrees of freedom and ensures a low friction movement to ease the positioning of the gauge 11.

More specifically, each support and guide assembly 10 includes, as visible in FIG. 2, three guides 30, 31, 32 which are provided with carriages with zero-clearance bearings and enable the assembly to move in three directions identified in the figure by the axes X, Y, Z in order to position the gauge 11 over the valve seat to be checked (axes X and Y), and to bring the gauge 11 to cooperate with the valve seat along a vertical direction parallel to the axis Z.

The guides 30, 31, 32 thus enable to position the gauge 11 at any point of the tilting table 3 in order to check valve seats and associated valve guides of any kind of cylinder head, and to reach the position where the sample groups 17 are arranged.

The guide 32 extending along the axis Z includes a support mechanism 12 for supporting the gauge 11 which enables the latter to self-position above the valve seat.

Figure 6:
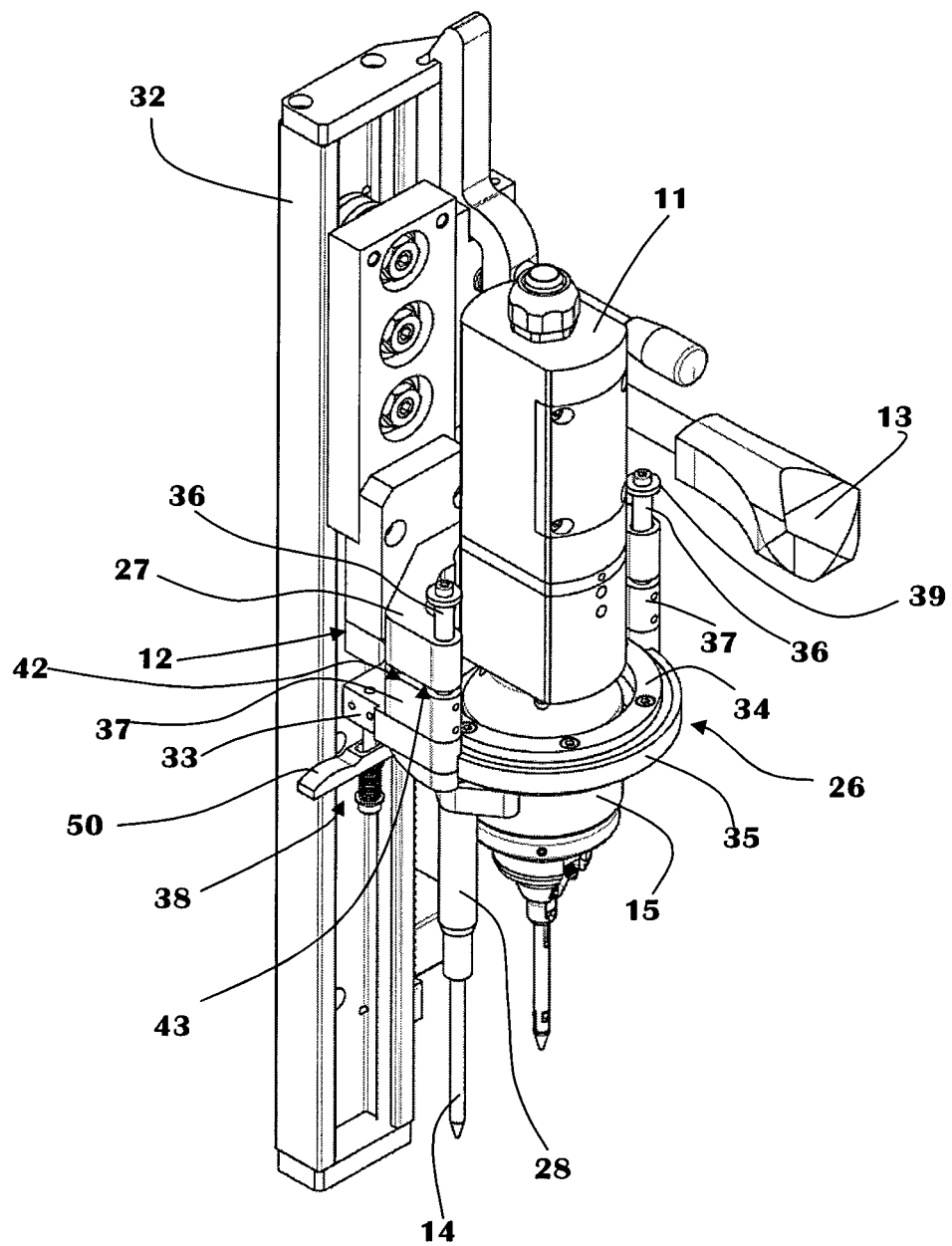
FIG. 6 is an enlarged view of a detail of the system of FIG. 1.

As it is visible in FIG. 6, the support mechanism 12 includes a bearing plate 33 perpendicular to the guide 32. The bearing plate 33 defines resting surfaces 42.

In addition to the resting surfaces 42, the guide and support assembly 10 includes matching surfaces 43 adapted to rest on said resting surfaces, as it will be described hereinafter in detail.

A ring 26 is connected to the bearing plate 33 and comprises two portions: a first portion 34 fixed to the bearing plate 33 and a second portion 35 movable with respect to the first portion 34. The gauge 11 is inserted in the ring 26 which serves as radial reference for the gauge 11 itself.

A vertically movable element 27, which is for example C-shaped as shown in the figures, is movably connected to the bearing plate 33 and includes the matching surfaces 43 adapted to rest on the resting surfaces 42 of the bearing plate 33. The C-shaped element 27 can translate vertically, i.e. perpendicularly to the bearing plate 33, that is slide upward and downward with respect to the latter. Different means can be used to connect the C-shaped element 27 to the bearing plate 33. In the preferred embodiment the C-shaped element is connected to the bearing plate 33 by means of two connecting bars 36 which pass through holes in the ends of the C-shaped element 27 and are fixed to the bearing plate 33. Each connecting bar 36 ends with an abutment plate 39 which limits the upward movement of the C-shaped element. The gauge 11 is fixed, for example by means of screws, to the C-shaped element 27. The connecting bars 36 are fixed directly to the bearing plate 33. As an alternative, the bearing plate 33 includes connecting elements 37, as shown in the figures, which define the resting surfaces 42 on which the matching surfaces 43 of the C-shaped element 27 rest.

The vertically movable element 27 shown in the figures is C-shaped but can also have different forms.

According to a first alternative embodiment the vertically movable element 27 is not connected to the bearing plate 33 (by means of the connecting bars 39 or any other element). In this case, the vertically movable element 27 is fixed only to the gauge 11 so that the matching surfaces 43 rest on the resting surfaces 42 defined by the bearing plate 33.

In the preferred and first alternative embodiments the matching surfaces 43 resting on the resting surfaces 42 of the bearing plate 33 are defined by the vertically movable element 27. However, in a second alternative embodiment the vertically movable element 27 can be omitted and said matching surfaces 43 be integral with the gauge 11 itself. The structure of the gauge 11 is thus modified properly so that the matching surfaces 43 integral with the gauge 11 rest on the resting surfaces 42 of the bearing plate 33.

The second portion 35 (the movable one) of the ring 26 is fixedly connected to an arm 28. One end of the arm 28 is connected to the ring 26 and the other end carries a precentering pin 14 which has the same form of the gauge nosepiece 15 and is arranged parallel to the latter. The precentering pin 14 is adapted to enter a valve guide of the valve close to, preferably adjacent to the one to be checked in order to render easy and safe the insertion of the gauge 11 in the valve seat to be checked. The dimensions of the arm 28 and the precentering pin 14 are such that the precentering pin 14 enters the respective valve guide before the gauge nosepiece 15 enters the valve guide to be checked, and that the end of the arm 28 carrying the precentering pin 14 abuts against the respective valve seat after the nosepiece 15 of the gauge 11 has reached a checking position in the valve seat to be checked.

The overall length of the arm 28 and of the precentering pin 14 is thus greater than the one of the gauge nosepiece 15 to guide the insertion of the gauge nosepiece 15 in the valve to be checked, ,and the arm 28 serves also as a stop for arresting the descent of the support mechanism 12 carrying the gauge 11.

The precentering pin 14 thus protects the gauge nosepiece 15 from damages or impacts caused by a wrong insertion of the gauge 11 into the valve seat and the valve guide to be checked.

A manual lever 50 is connected to a locking/unlocking mechanism 38 which enables the rotation of 180 degrees of the movable portion of the ring 26 and thus of the precentering pin 14 thereto connected. Such operation enables to insert the precentering pin 14 in a valve guide adjacent or close to the one to be checked, whether said adjacent valve guide is to the left or to the right of the valve guide to be checked.

The guide 32 extending along the axis Z further includes a handle 13 fixed to the support mechanism 12 and a gauge unlocking device to disengage the support mechanism 12 from the guide and support assembly 10 and enable the descent of the support mechanism 12 and the gauge 11.

An antigravity system, per se known and not shown or described in detail, is also provided to control the descent of the support and guide assembly 10 and avoid damages to the gauge 11.

The gauges used in the modular system according to the invention are plug gauges of a known type and include feelers for cheeking both the valve seat and the valve guide, and a joint, for example, a double cardan joint, which allows the nosepiece 15 to perform limited movements with respect to the other part of the gauge 11.

Processing and display means, marked with reference 29, are connected to the gauge 11 to provide and display measuring information.

The operation of the modular system 1 according to the present invention is hereinafter described.

The tilting table 3 is preliminarily adjusted depending on the dimensions and layout of the cylinder head 4 to be checked in order to align the axis defined by the valve seat and its associated valve guide to be checked with the axis defined by the gauge 11.

More specifically, the tilt of the tilting table 3 is adjusted by changing the position of the stop blocks 19 with respect to the base portion 2' of the support frame 2 so that the abutment surfaces 23 of the stop blocks 19 abut against suitable points of the rods 40 of the swing systems and the tilting table 3 can take two predetermined positions for checking intake valve seats and exhaust valve guides of the cylinder head 4, respectively.

Also the position of the locating means, that is the four reference pins 24 and the two centering pins 5 and the associated bearing elements 8, on the bearing surface 22 of the tilting table 3 is adjusted in order to locate the cylinder head 4 with respect to the tilting table 3.

After the cylinder head 4 has been loaded on the tilting table 3, the operator manoeuvres, by means of the handle 13, the support mechanism 12 of one of the gauges 11 and moves it into position over the valve seat to be checked. Then he lowers the support mechanism 12 until the gauge 11 is inserted in the valve seat.

As explained above, the presence of the precentering pin 14 entering the valve guide close, preferably adjacent, to the one to be checked enables to center the gauge 11 in the valve seat and its associated valve guide to be checked.

The dimensions of the precentering pin 14 and the arm 28 which carries it are such that the precentering pin 14 enters the adjacent valve guide before the gauge 11 enters the valve guide to be checked, serving as guide for the gauge nosepiece 15.

When the gauge 11 reaches the checking position in the valve seat to be checked, the gauge 11 stops its motion. The support and guide assembly 10 instead continues to be lowered until the end of the arm 28 carrying the precentering pin 14 abuts against the valve seat close, preferably adjacent, to the one to be checked.

Thus, in a checking condition in which the gauge 11 cooperates with the seat valve to be checked, the matching surfaces 43 defined in the preferred embodiment by the vertically movable element 27 (or integral with the gauge 11 itself according to one of the alternative embodiments) and the resting surfaces 42 of the bearing plate 33 mutually detach so that the gauge 11 is substantially unconstrained at least in the vertical direction along the Z axis. It is to be noted that, according to the above-mentioned first and second alternative embodiments, in the checking condition the gauge 11 stands substantially unconstrained in all directions.

More specifically, in the preferred embodiment the presence of the vertically movable C-shaped element 27 enables the gauge 11 to stop its motion when it reaches the checking position in the valve seat to be checked, and the support and guide assembly 10 to continue to lower until the arm 28 carrying the precentering pin 14 abuts against the respective valve seat. Thanks to the connecting bars 36, the C-shaped element 27 slides upwards, with reference to the orientation of the figures, with respect to the bearing plate 33 and the matching surfaces 43 defined by the C-shaped element 27 detach from the resting surfaces 42 of the bearing plate 33. This enables the gauge 11 to have only one mechanical reference, that is the valve seat, during the checking procedure. This prevent the measurement from being affected by any force exerted by the support frame 2 or other components of the system.

Thanks to the particular structure of the support mechanism 12, the force exerted on the valve seat to be checked during each checking procedure is always the same and is that one exerted by the weight of the gauge 11 itself, and the gauge 11 is substantially unconstrained at least in the vertical direction with respect to the support frame 2.

In the preferred embodiment which includes also the vertically movable element 27, the force exerted on the valve seat to be checked during each checking procedure is obviously that one exerted by the weight of the gauge 11 itself and of the vertically movable element 27.

Then the operator releases the support and guide assembly 10 and initiates the checking procedure which is here not described. There is no direct manual handling of the gauge 11 during the checking procedure.

After completion of the checking procedure the operator lifts the gauge 11 out of the valve seat by pulling the support mechanism 12 upwards and manoeuvres it over the next valve seat and valve guide to be checked.

The modular system herein described includes two gauges and associated support and guide assemblies and sample groups. The number of these components can be different and the system structure can be modified accordingly.

It is to be noted that the particular connection of the tilting table 3 to the support frame 2, including the swing system 6, allows to align the valve seats to be checked (intake and exhaust valve seats, alternatively) along directions close to each other, so that the guide and support assembly 10 of the gauge 11 has to perform very limited movements in the Y direction, allowing to render more rapid easier the checking operations.

The invention claimed is:

1. A modular system for checking a valve seat and a valve guide in cylinder heads of internal combustion engines, the system including:
   a support frame,
   one or more electronic gauges with a nosepiece for checking dimensional and geometric features of the valve seat and the valve guide,
   a guide and support assembly movably coupled to the support frame with three degrees of freedom and carrying one or more electronic gauges, the guide and support assembly being adapted to position said one gauge over the valve seat to be checked, and to bring the gauge to cooperate with the valve seat along a vertical direction,
   a precentering pin connected to said guide and support assembly adapted to guide the insertion of the gauge in the valve seat and the valve guide by entering a valve seat and a valve guide close to the valve seat and the valve guide to be checked,
   wherein said guide and support assembly includes resting surfaces and matching surfaces integral with said one gauge which rest on said resting surfaces, in a checking condition in which said one gauge cooperates with the valve seat to be checked, the matching surfaces integral with the gauge and the resting surfaces being adapted to mutually detach so that said one gauge is substantially unconstrained at least in said vertical direction.

2. The modular system according to claim 1, wherein the guide and support assembly includes a support mechanism with a bearing plate defining the resting surfaces.

3. The modular system according to claim 2, wherein the support mechanism includes a vertically movable element which is connected to the gauge and includes the matching surfaces.

4. The modular system according to claim 3, wherein the vertically movable element is connected to the bearing plate.

5. The modular system according to claim 4, wherein the vertically movable element is C-shaped and is connected to the bearing plate by means of connecting bars which pass through holes in the ends of the vertically movable element.

6. The modular system according to claim 2, wherein the bearing plate further includes connecting elements, the resting surfaces being defined by said connecting elements.

7. The modular system according to claim 2, wherein the support mechanism further comprises a ring with a first portion fixed to the bearing plate and a second portion movable with respect to the first portion, the gauge being inserted in the ring which serves as radial reference for the gauge.

8. The modular system according to claim 7, wherein the precentering pin is connected to the second portion of the ring by means of an arm.

9. The modular system according to claim 8, wherein the dimensions of the arm and of the precentering pin are such that the precentering pin enters the valve guide close to the one to be checked before the nosepiece of the gauge enters the valve guide to be checked, and that the arm carrying the precentering pin abuts against the valve seat close to the one to be checked after the nosepiece of the gauge has reached a checking position in the valve seat to be checked.

10. The modular system according to claim 8, wherein a manual lever is connected to a locking/unlocking mechanism which enables the rotation of 180 degrees of the second portion of the ring and of the precentering pin thereto connected.

11. The modular system according to claim 1, wherein the guide and support assembly includes three guides which enable the guide and support assembly to move in three directions.

12. The modular system according to claim 1, wherein a tilting table for loading and locating a cylinder head is connected to the support frame, the tilting table including a swing system to align the axis defined by the valve seat and its associated valve guide to be checked with an axis defined by the gauge.

13. The modular system according to claim 12, wherein the tilting table can take two stationary positions.

14. The modular system according to claim 12, wherein the swing system includes a blocking mechanism for blocking the tilt of the tilting table comprising stop blocks connected to a base portion of the support frame in a removable way, the tilt of the tilting table being adjusted by changing the position of the stop blocks with respect to the base portion.

15. The modular system according to claim 12, wherein the tilting table includes locating means for locating the cylinder head with respect to the tilting table, said locating means including reference pins and centering pins and being connected to the tilting table in a removable way.

16. The modular system according to claim 15, wherein the tilting table includes grooves, the locating means being coupled to said grooves of the tilting table.

17. A modular system for checking a valve seat and a valve guide in cylinder heads of internal combustion engines, the system including:
   a support frame,
   one or more electronic gauges with a nosepiece for checking dimensional and geometric tolerances of the valve seat and the valve guide,
   a guide and support assembly movably coupled to the support frame with three degrees of freedom and carrying one or more electronic gauges, the guide and support assembly being adapted to position said one gauge over the valve seat to be checked, and to bring the gauge to cooperate with the valve seat along a vertical direction,
   a precentering pin connected to said guide and support assembly adapted to guide the insertion of the gauge in the valve seat and the valve guide by entering a valve seat and a valve guide close to the valve seat and the valve guide to be checked, wherein
   said guide and support assembly includes resting surfaces and matching surfaces integral with said one gauge which rest on said resting surfaces, in a checking condition in which said one gauge cooperates with the valve seat to be checked, the matching surfaces integral with the gauge and the resting surfaces being adapted to mutually detach so that said one gauge is substantially unconstrained at least in said vertical direction, and
   the modular system further comprises a tilting table for loading and locating a cylinder head, said tilting table including a swing system to align the axis defined by the valve seat and its associated valve guide to be checked with the axis defined by the gauge.

18. The modular system according to claim 17, wherein the swing system of the tilting table includes stop blocks connected to a base portion of the support frame in a removable way, the tilt of the tilting table being adjusted by changing the position of the stop blocks with respect to the base portion.

* * * * *